US007813635B2

(12) United States Patent
Tamura (10) Patent No.: US 7,813,635 B2
(45) Date of Patent: Oct. 12, 2010

(54) PHOTOGRAPHING APPARATUS, METHOD FOR CONTROLLING PHOTOGRAPHING APPARATUS AND COMPUTER-READABLE RECORDING MEDIUM CONTAINING PROGRAM

(75) Inventor: Kazunori Tamura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 260 days.

(21) Appl. No.: 12/021,064

(22) Filed: Jan. 28, 2008

(65) Prior Publication Data

US 2008/0181597 A1    Jul. 31, 2008

(30) Foreign Application Priority Data

Jan. 29, 2007    (JP)    ............................ 2007-017406

(51) Int. Cl.
  G03B 15/03    (2006.01)
  H04N 5/222   (2006.01)
(52) U.S. Cl. ........................ 396/155; 396/157; 396/164; 348/370
(58) Field of Classification Search ................. 396/155, 396/157, 158, 164; 348/370, 371
See application file for complete search history.

(56) References Cited

U.S. PATENT DOCUMENTS

| 7,589,784 B2 * | 9/2009 | Chiba et al. .................. 348/371 |
| 2006/0044422 A1 | 3/2006 | Miyazaki |

FOREIGN PATENT DOCUMENTS

| JP | 2001-215404 A | 8/2001 |
| JP | 2003-107555 A | 4/2003 |
| JP | 2003-107567 A | 4/2003 |
| JP | 2005-065186 A | 3/2005 |
| JP | 2006-074164 A | 3/2006 |
| JP | 2006-145629 A | 6/2006 |

OTHER PUBLICATIONS

Adelson, E.H., and A.P. Pentland. "The Perception of Shading and Reflectance." 09122003. Web. Dec. 5, 2009. <http://web.mit.edu/persci/people/adelson/pub_pdfs/shading96.pdf>.*

* cited by examiner

Primary Examiner—W. B. Perkey
Assistant Examiner—Minh Q Phan
(74) Attorney, Agent, or Firm—Birch, Stewart, Kolasch & Birch, LLP

(57) ABSTRACT

A photographing apparatus includes: a photographing unit for obtaining an image representing a subject through photographing; a face detecting unit for detecting a face from the image obtained by the photographing unit; and a reflectance calculating unit for calculating a reflectance of the face. The reflectance calculating unit obtains a result of the face detection by the face detecting unit at a predetermined point of time after acquisition of the image by the photographing unit has begun, obtains images of the same subject taken with flash emission and taken without flash emission, and if the obtained detection result indicates that a face is contained, calculates the reflectance of the face based on a difference in brightness of the face between the images taken with flash emission and taken without flash emission and the size of the face.

5 Claims, 5 Drawing Sheets

PHOTOGRAPHING APPARATUS, METHOD FOR CONTROLLING PHOTOGRAPHING APPARATUS AND COMPUTER-READABLE RECORDING MEDIUM CONTAINING PROGRAM

BACKGROUND OF THE INVENTION

1. Field of the Invention

The present invention relates to a photographing apparatus for obtaining an image through photographing, a method for controlling the photographing apparatus, and a computer-readable recording medium containing a program for causing a computer to carry out the controlling method.

2. Description of the Related Art

Various techniques have been proposed for providing desirable image quality of the face of a person in an image taken with a digital camera. Such techniques include, for example, a technique of setting an appropriate exposure condition for photographing a person when a person is contained in an image to be taken (see Japanese Unexamined Patent Publication No. 2001-215404), a technique of controlling exposure based on resulted photometric data of a face in an image and resulted photometric data of the entire image (see Japanese Unexamined Patent Publication No. 2003-107555), and a technique of controlling flash emission to achieve red-eye reduction based on a result of face detection in an image to be taken (see Japanese Unexamined Patent Publication No. 2003-107567). Further, a technique has been proposed, in which images are taken without flash emission and with preliminary flash emission, and a face region is detected from each of the two images. Then, a light intensity of the flash is controlled based on a difference in luminance between the face regions in the two images (see U.S. Patent Application Publication No. 20060044422).

In the technique described in U.S. Patent Application Publication No. 20060044422, however, the light intensity of the flash is uniformly controlled to provide a predetermined target brightness of the face. Therefore, the brightness of the face in the obtained image may be unnatural depending on the skin color of the person. For example, a target brightness which is appropriate for a person with dark skin and provides a desirable image with clear details of the face may be too light for a person with light skin and may cause white out of the skin region in the image. On the other hand, a target brightness which is appropriate for a person with light skin and provides a desirable image with darker skin color may be too dark for a person with dark skin and may result in unclear details of the face.

SUMMARY OF THE INVENTION

In view of the above-described circumstances, the present invention is directed to providing appropriate brightness of the face of a person in a photographed image regardless of the skin color of the person.

The photographing apparatus according to the invention includes: a photographing unit for obtaining an image representing a subject through photographing; a face detecting unit for detecting a face from the image obtained by the photographing unit; and a reflectance calculating unit for calculating a reflectance of the face, the reflectance calculating unit obtaining a result of the face detection by the face detecting unit at a predetermined point of time after acquisition of the image by the photographing unit has begun, obtaining images of the same subject taken with flash emission and taken without flash emission, and if the obtained detection result indicates that a face is contained, calculating the reflectance of the face based on a difference in brightness of the face between the images taken with flash emission and taken without flash emission and the size of the face.

The "predetermined point of time after acquisition of the image by the photographing unit has begun" may be any point after the photographing unit has begun photographing and before the calculation of the reflectance according to the invention is carried out. The predetermined point of time may be, for example, a point when the release button is half pressed, when the release button is fully pressed, when the image taken with flash emission is obtained or when the image taken without flash emission is obtained.

It should be noted that the images taken with flash emission and without flash emission may be obtained not only through the photographing with and without emission of the flash, but also through photographing by the photographing unit with and without emission of AF assist light or tally light.

The photographing apparatus of the invention may further include: a flash emitting unit for emitting flash light; and a light intensity controlling unit for controlling light intensity of the flash with reference to the detection result outputted by the face detecting unit at the predetermined point of time. The light intensity controlling unit calculates target luminance for the face based on the reflectance if the detection result obtained at the predetermined point of time indicates that the face is contained, and controls the light intensity of the flash with reference to the detection result and the target luminance.

In this case, the photographing unit may carry out photographing with emission of the flash and photographing without emission of the flash to obtain the images taken with flash emission and taken without flash emission.

The flash emitting unit may be a built-in flash or an external flash that can be attached to and removed from the camera. The reflectance calculating unit, the face detecting unit and the light intensity controlling unit may be implemented as a reflectance calculating circuit, a face detection circuit and a flash control circuit which are independent from each other, or may be implemented as a reflectance calculating program, a face detection program and a flash control program which are stored in a memory and operations according to the programs may be carried out by a CPU.

The method for controlling a photographing apparatus according to the invention is a method for controlling a photographing apparatus including a photographing unit for obtaining an image representing a subject through photographing and a face detecting unit for detecting a face from the image obtained by the photographing unit. The method includes: obtaining a result of the face detection by the face detecting unit at a predetermined point of time after acquisition of the image by the photographing unit has begun; obtaining images of the same subject taken with flash emission and taken without flash emission; and if the obtained detection result indicates that a face is contained, calculating a reflectance of the face based on a difference in brightness of the face between the images taken with flash emission and taken without flash emission and the size of the face.

It should be noted that the invention may also be implemented in the form of a computer-readable recording medium containing a program for causing a computer to carry out the method for controlling the photographing apparatus.

DESCRIPTION OF THE PREFERRED EMBODIMENTS

Hereinafter, a single-lens reflex digital camera having a flash photography function and a method for controlling the light intensity of the flash of the digital camera according to embodiments of the present invention will be described by way of examples.

Figure 1:
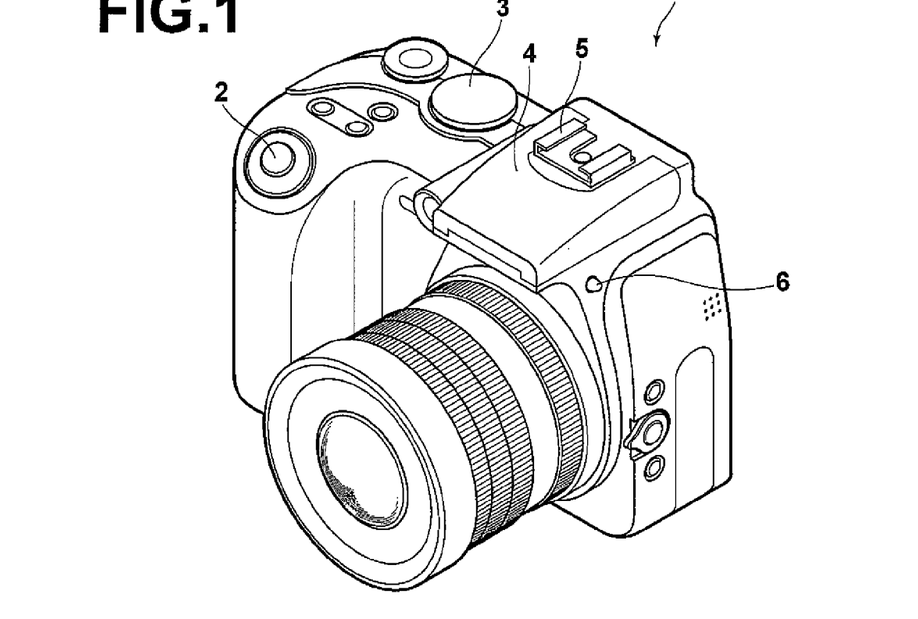
FIG. 1 illustrates the appearance of a digital camera according to one embodiment of the present invention (in an ordinary state)
Figure 2:
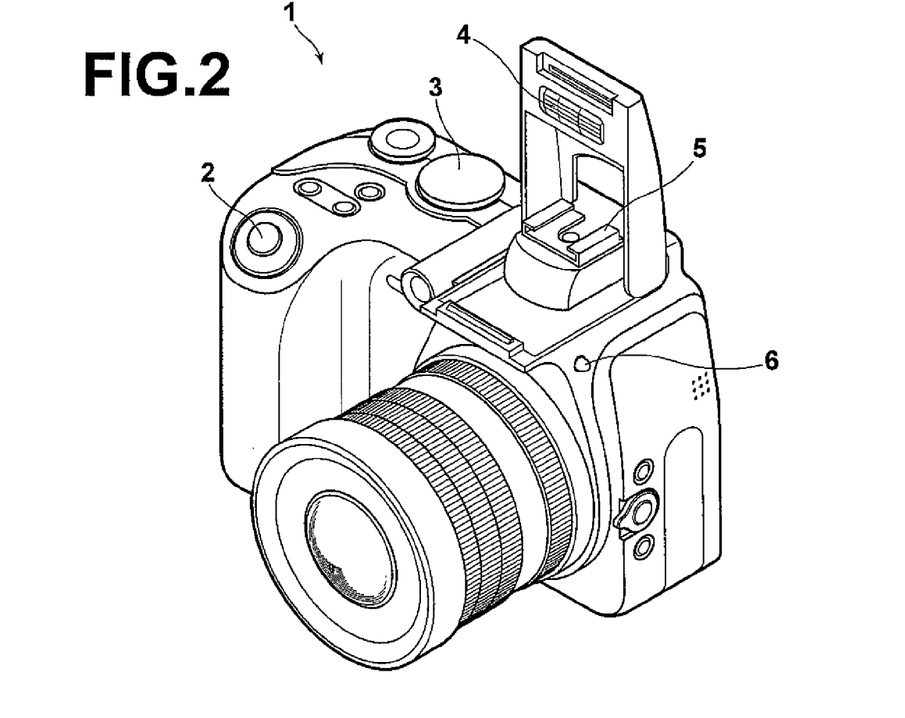
FIG. 2 illustrates the appearance of the digital camera according to one embodiment of the invention (with a built-in flash popped up)
Figure 3:
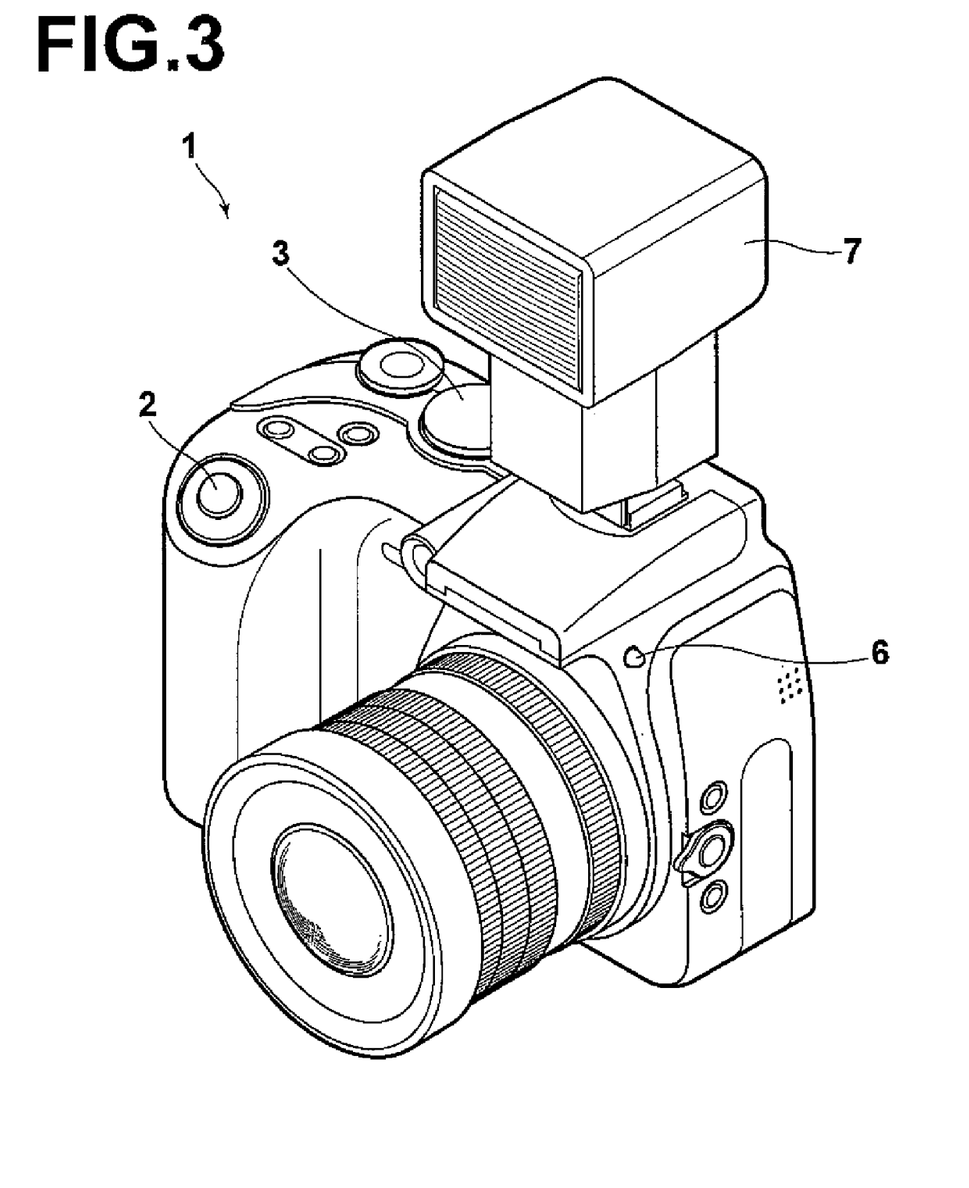
FIG. 3 illustrates the appearance of the digital camera according to one embodiment of the invention (with an external flash attached)

FIGS. 1 to 3 illustrate the appearance of a digital camera 1 of one embodiment of the invention. As shown in FIG. 1, the digital camera 1 includes, at the upper area thereof, a shutter release button 2, a mode dial 3 used for setting the photography mode, a built-in flash 4 and a hot shoe 5 to which an accessory is attached.

The shutter release button 2 allows two steps (first and second steps) of pressing operations thereof by the user so that the user can instruct two different operations of the camera. For example, when an image is taken using an automatic exposure adjusting function (AE: Auto Exposure) and/or an automatic focus adjusting function (AF: Auto Focus), the digital camera 1 prepares for photographing, i.e., adjusts the exposure and the focus, when the shutter release button 2 is pressed lightly (also referred to as "half-pressed" or "first-step pressing operation"). In this state, when the shutter release button 2 is pressed firmly (also referred to as "fully pressed" or "second-step pressing operation"), the digital camera 1 starts exposure and records a frame of image data obtained through the exposure in a memory card.

As shown in FIG. 2, the built-in flash 4 opens to extend upward (hereinafter referred to as "pops up") from the camera body when a flash pop-up button 6 is pressed. In some photography modes, the built-in flash 4 may automatically pop up. The popped-up built-in flash 4 emits the flash light twice when the second-step pressing operation of the shutter release button 2 is made. The first flash emission is preliminary flash emission (pre-flash) for measuring an amount of reflected light from the subject, and has a far smaller light intensity than usual flash emission. Besides measuring the amount of the reflected light, the purposes of the preliminary flash emission include prevention of red eye. The second flash emission is actual flash emission for supplying sufficient light for photographing the subject (to provide an appropriate amount of exposure). If the light intensity of the actual flash emission is appropriate, an image with appropriate brightness can be obtained.

The operation of the built-in flash 4 depends not only on manipulation of the shutter release button 2 by the user but also on the photography mode set by the user via the mode dial 3. As the photography mode, various modes are prepared, such as "automatic" in which all the settings relating to photographing are automatically made in the camera, "manual" in which all the settings relating to photographing are manually made by the user, and modes for various scenes such as "programmed automatic", "shutter-priority automatic", "aperture priority automatic", "blur reduction", "natural photo", "person", "landscape" and "night scene". In the "automatic" mode, if it is determined that emission of the flash is necessary, the digital camera 1 automatically makes the built-in flash 4 to pop up and emit flash light when the shutter release button 2 is pressed. On the other hand, if the digital camera 1 is set in the "natural photo" mode, which is a mode for carrying out photographing without emission of the flash, the built-in flash 4 does not operate when the shutter release button 2 is pressed. In this manner, the operation of the built-in flash 4 is determined appropriately for each of the various modes.

It should be noted that, as shown in FIG. 3, the digital camera 1 can also be used with an external flash 7 attached to the hot shoe 5. The external flash 7 attached to the hot shoe 5 is mechanically and electrically connected to the digital camera 1, and thus the flash emission along with the second-step pressing operation of the shutter release button 2 is controlled according to the photography mode set via the mode dial 3, similarly to the built-in flash 4. Although the following description is made mainly in conjunction with the embodiment shown in FIGS. 1 and 2, the invention is equally applicable to both the built-in flash and external flash configurations.

Figure 4:
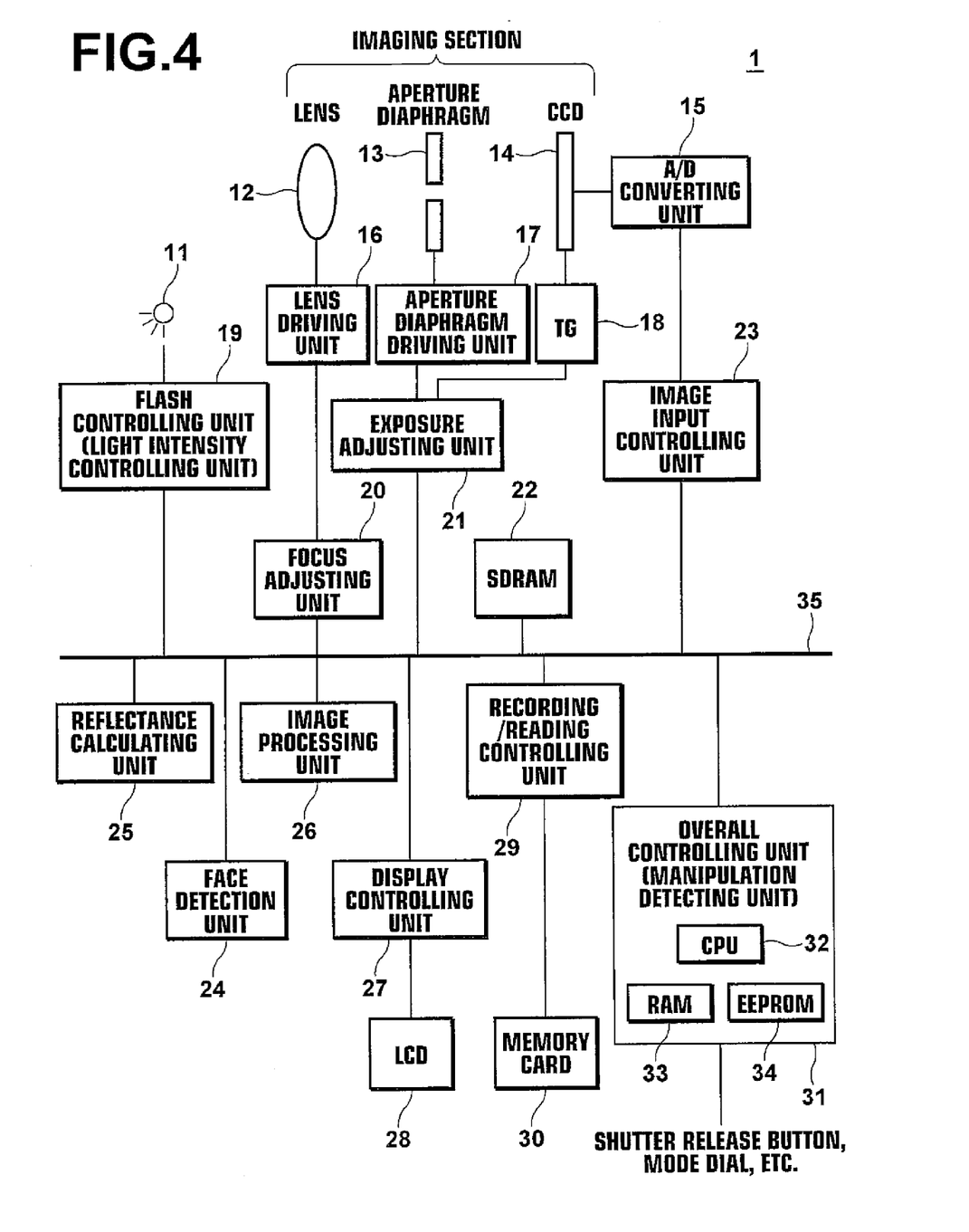
FIG. 4 is a diagram illustrating the internal configuration of the digital camera.

Now, the internal configuration of the digital camera 1 is described with reference to FIG. 4. As shown in FIG. 4, the digital camera 1 includes an imaging section formed by a lens 12, a lens driving unit 16, an aperture diaphragm 13, an aperture diaphragm driving unit 17, a CCD 14 and a timing generator (TG) 18.

The lens 12 is formed by lenses having different functions such as a focusing lens for focusing on the subject and a zooming lens for effecting a zooming function. The lens driving unit 16 is formed by a small motor such as a stepping motor, and adjusts the positions of the lenses having different functions to set an appropriate distance for each purpose between the CCD 14 and each lens.

The aperture diaphragm 13 is formed by multiple aperture blades. The aperture diaphragm driving unit 17 is formed by a small motor such as a stepping motor, and adjusts positions of the aperture blades to set an appropriate aperture size for each purpose.

The CCD 14 has 500 to 12,000,000 pixels and is provided with color filters of primary colors. The CCD 14 accumulates and discharges electric charges according to instruction signals fed from the timing generator 18. The timing generator 18 feeds the signals to the CCD 14 so that the electric charges are accumulated in the CCD 14 for a desired period of time, thereby adjusting the shutter speed.

The digital camera 1 further includes an A/D converting unit 15 for converting a signal outputted from the CCD 14 into a digital signal, an image input controlling unit 23 for transferring image data outputted from the A/D converting unit 15 to other processing units over a system bus 35, and an SDRAM 22 for temporarily storing the image data transferred by the image input controlling unit 23. The image data stored in the SDRAM 22 is raw data.

The digital camera 1 further includes a flash 11, a flash controlling unit 19 for controlling a timing of emission and light intensity of the flash 11, a focus adjusting unit 20 for adjusting the focus by instructing the lens driving unit 16 to move the lenses, an exposure adjusting unit 21 for determining an aperture value and a shutter speed and feeding instruction signals to the aperture diaphragm driving unit 17 and the timing generator 18, a face detection unit 24 for detecting a face from the image data stored in the SDRAM 22, and a reflectance calculating unit 25 for calculating a reflectance of a face contained in the image represented by the image data.

Besides the image data stored in the SDRAM 22, the flash controlling unit 19, the focus adjusting unit 20 and the exposure adjusting unit 21 may also reference detection results outputted by the face detection unit 24 to carry out their operations. The flash controlling unit 19 may reference the reflectance calculated by the reflectance calculating unit 25 to carry out its operations.

It should be noted that, for adjusting the exposure with reference to the face detection results, methods described, for example, in Japanese Unexamined Patent Publication Nos. 2001-215404 and 2003-107555 may be used. For adjusting the focus with reference to the face detection results, a method described, for example, in Japanese Unexamined Patent Publication No. 2006-145629 may be used. Whether or not the detection results outputted by the face detection unit 24 and/or the reflectance outputted by the reflectance calculating unit 25 should be referenced by the flash controlling unit 19, the focus adjusting unit 20 and/or the exposure adjusting unit 21 is determined according to the photography mode and other setting values.

It should be noted that the "detection result" outputted by the face detection unit 24 herein refers to information indicating whether a face has been detected or not and, if a face has been detected, face information of the detected face (such as the position and the size of the face). Therefore, if no face has been detected, the detection result does not contain the face information. If a face has been detected, the detection result contains the face information.

The digital camera 1 further includes an image processing unit 26 for applying image processing to the image data stored in the SDRAM 22. The image processing unit 26 applies various finishing operations to the image data for improving appearance of the image, such as color tone correction and brightness correction for providing the image with natural color and brightness, and conversion of red eyes (if any) in the image data into black eyes, and then stores the processed image data in the SDRAM 22 again.

The digital camera 1 further includes a display controlling unit 27 for controlling output of the image data stored in the SDRAM 22 to a liquid crystal display (LCD) monitor 28. The display controlling unit 27 applies thinning to the image data stored in the SDRAM 22 to reduce the number of pixels of the image data, i.e., the size of the image, to an appropriate size to be displayed on the LCD monitor 28, and outputs the processed image data to the LCD monitor 28.

The digital camera 1 further includes a recording/reading controlling unit 29 for controlling writing of the image data stored in the SDRAM 22 into the memory card 30 and loading of the image data recorded in the memory card 30 into the SDRAM 22. Depending on the setting by the user, the recording/reading controlling unit 29 records the raw data in the memory card 30 or applies compression coding to the raw data to convert the data into JPEG data and records the JPEG data in the memory card 30. When the JPEG data is loaded, the JPEG data is subjected to a reverse conversion before loaded in the SDRAM 22.

The digital camera 1 further includes an overall controlling unit 31 formed by a CPU (Central Processor Unit) 32, a RAM (Random Access Memory) 33 for storing operation/control programs, and an EEPROM (Electronically Erasable and Programmable Read Only Memory) 34 for storing various setting values. The overall controlling unit 31 detects various setting operations made by the user, such as setting of the photography mode via the mode dial, and stores the setting in the EEPROM 34. Then, when the setting operation is carried out or a photographing operation is carried out, the overall controlling unit 31 sends signals indicating operations to be executed and timings for executing the operations to the flash controlling unit 19, the focus adjusting unit 20, the exposure adjusting unit 21, the image input controlling unit 23, the face detection unit 24, the reflectance calculating unit 25, the image processing unit 26, the display controlling unit 27 and the recording/reading controlling unit 29 via the system bus 35, according to the setting values stored in the EEPROM 34.

Now, control of the light intensity of the flash by the flash controlling unit 19 will be described in detail below.

Figure 5:
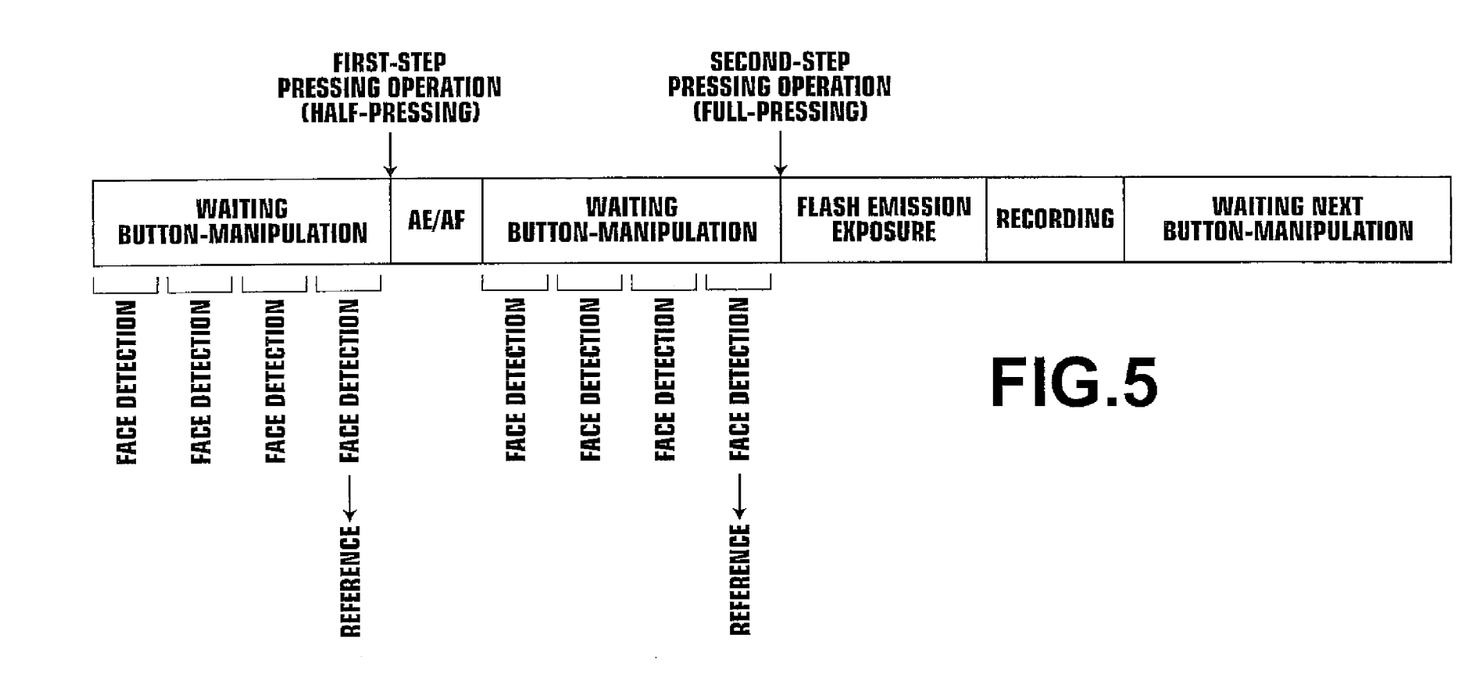
FIG. 5 is a diagram illustrating a relationship between manipulation of a shutter release button of the digital camera and operations of the digital camera according to the embodiment.

FIG. 5 illustrates operations carried out in the digital camera when the exposure adjusting function, the focus adjusting function and the flash control function using the face detection results are valid, in order of time from the left to the right in the drawing, and in particular, a relationship between manipulation of the shutter release button and operations in the digital camera 1 of this embodiment.

As shown in FIG. 5, when the digital camera is waiting manipulation of the button by the user ("button-manipulation waiting state"), and the user makes the first-step pressing operation (half-pressing) of the shutter release button 2, the digital camera 1 carries out the AE/AF processing, and then returns to the button-manipulation waiting state when the AE/AF processing has been finished. In this state, when the user makes the second-step pressing operation (full-pressing) of the shutter release button 2, the flash is emitted and exposure is carried out, and an image obtained through the exposure is recorded in the memory card 30. As the image has been recorded, the digital camera 1 returns to the button-manipulation waiting state. It should be noted that the above-described operations are carried out in a case where the second-step pressing operation is made some time after the first-step pressing operation. If the user presses the shutter release button 2 fully to the second step at once, the digital camera 1 carries out the AE/AF processing and then immediately carries out the flash emission and exposure.

As shown in FIG. 5, the digital camera 1 repeatedly carries out the face detection before the AE/AF processing, and uses the detection results for the AE/AF processing. The digital camera 1 also repeatedly carries out the face detection while it is in the button-manipulation waiting state after the AE/AF processing. The detection results of the face detection carried out before and after the AE/AF processing are used to control the light intensity of the flash.

In this embodiment, as shown in FIG. 5, the detection result of the face detection obtained just before the first-step pressing operation of the shutter release button 2 (hereinafter referred to as the "first detection result") among the face detection results obtained before the AE/AF processing, and the detection result of the face detection obtained just before the second-step pressing operation of the shutter release button 2 (hereinafter referred to as the "second detection result") among the face detection results obtained after the AE/AF processing are referenced.

Now, if a face is contained in an area to be photographed when the shutter release button 2 is pressed to the first step, this may indicate that the user intends to photograph the subject of the face. However, it may also be the case that the face is contained in the area to be photographed against the user's intention. If the user really intends to photograph the face, the face should be contained not only in the detection results obtained before the AE/AF processing, but also in the detection results obtained after the AE/AF processing. Therefore, by checking whether or not the face information is included in the second detection result obtained after the AE/AF processing, whether or not the face detected before the AE/AF processing is the subject intended by the user can be determined.

Therefore, in this embodiment, if the first detection result includes the face information, reference is further made to the second detection result, and if the second detection result includes the face information, the face information included in the first detection result is determined to be valid and the light intensity of the flash is controlled accordingly. In contrast, if the second detection result does not include the face information, the face information included in the first detection result is determined to be invalid and the light intensity of the flash is controlled accordingly. Further, if the first detection result does not include the face information, it can be judged that the user intends to photograph a subject other than the face regardless of the second detection result. Therefore, if the first detection result does not include the face information, the second detection result is not referenced and the face information is determined to be invalid, and the light intensity of the flash is controlled accordingly.

Figure 6:
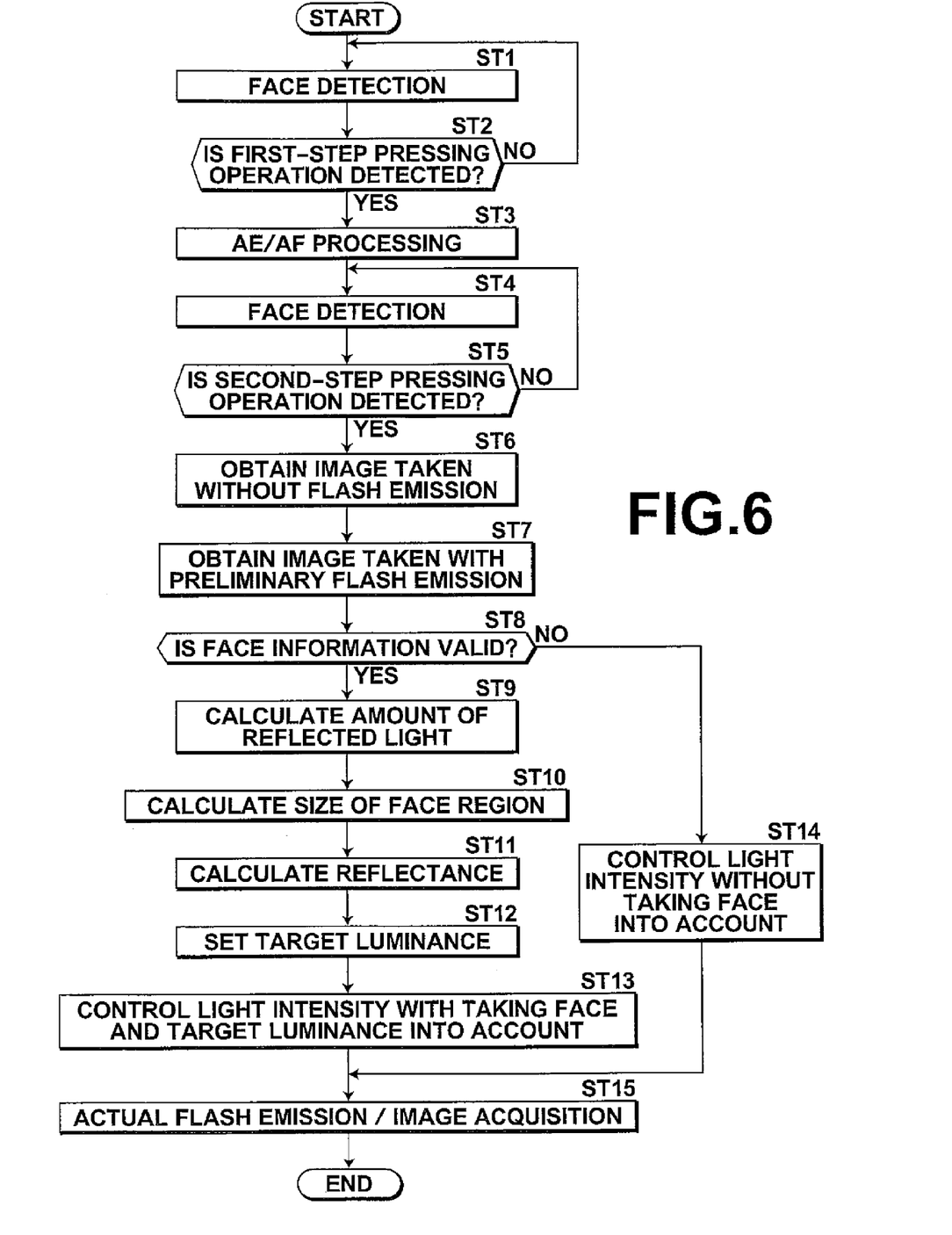
FIG. 6 is a flowchart illustrating a process carried out in the embodiment.

Next, a process carried out in this embodiment will be described. FIG. 6 is a flowchart illustrating the process carried cut in this embodiment. In the following description, operations shown in this flowchart are explained in conjunction with the configuration of the digital camera 1 shown in FIG. 4.

If a value indicating necessity of the face detection, among the setting values stored in the EEPROM 34, indicates that the face detection is necessary, the overall controlling unit 31 sends to the face detection unit 24 a signal to instruct the face detection unit 24 to carry out the face detection and feed the detection result to the flash controlling unit 19, the focus adjusting unit 20, the exposure adjusting unit 21 and the reflectance calculating unit 25. In response to the instruction signal, the face detection unit 24 begins the face detection (step ST1). The face detection is repeatedly carried cut until a pressing operation of the shutter release button 2 is detected.

As the first-step pressing operation of the shutter release button 2 is detected (step ST2: YES), the overall controlling unit 31 sends a notification signal notifying that the pressing operation is detected to the flash controlling unit 19, the focus adjusting unit 20 and the exposure adjusting unit 21. In response to the notification signal, the exposure adjusting unit 21 carries out the AE processing, and the focus adjusting unit 20 carries out the AF processing (AE/AF processing, step ST3). The flash controlling unit 19 and the reflectance calculating unit 25 retain the detection result fed just before the first-step pressing operation of the shutter release button 2 as the first detection result. After step ST3, the face detection unit 24 continues the face detection (step ST4).

As the overall controlling unit 31 detects the second-step pressing operation of the shutter release button 2 (step ST5: YES), the flash controlling unit 19 and the reflectance calculating unit 25 obtain an image taken without flash emission, i.e., the latest image data stored in the SDRAM 22 (step ST6). The flash controlling unit 19 and the reflectance calculating unit 25 retain the detection result fed just before the second-step pressing operation of the shutter release button 2 as the second detection result. Further, the flash controlling unit 19 carries out preliminary flash emission, and the flash controlling unit 19 and the reflectance calculating unit 25 obtain image data that is taken with the preliminary flash emission and is stored in the SDRAM 22 (step ST7).

Subsequently, the flash controlling unit 19 determines whether or not the face information is valid based on the first and second detection results (step ST8). If the determination in step ST8 is affirmative, the reflectance calculating unit 25 calculates a reflectance of the face contained in the area to be photographed. The calculation of the reflectance is explained below.

A relationship between a reflectance of a general object and an amount of reflected light in a case of a point light source is expressed as equation (1) below:

$$Lr = R \cdot k0 / r^4 \qquad (1),$$

wherein Lr represents an amount of reflected light, R represents a reflectance, k0 represents a constant determined by a light intensity of the light source, and r represents a distance from the light source. As can be seen from equation (1), the amount of reflected light Lr is inversely proportional to the fourth power of the distance r from the light source to the object. Supposing that S represents a size of an object at the distance r from the light source, the size S is inversely proportional to the second power of the distance r. In this embodiment, the size S is an area of the face. Therefore, using the object size S in place of the distance r, equation (1) is rewritten as equation (2) below:

$$Lr = R \cdot k1 \cdot S^2 \qquad (2)$$

It should be noted that k1 in equation (2) is a constant corresponding to k0 in equation (1). Now, supposing that S0 represents a size of a face region of a face of a person having a reference reflectance R0 at a reference distance r0 from the light source, and Lr0 represents an amount of reflected light, equation (2) is rewritten as equation (3) below:

$$Lr0 = R0 \cdot k1 \cdot S0^2 \qquad (3)$$

If a face is detected, i.e., the face information is valid, then the image taken without flash emission (hereinafter referred to as a "no-flash image G1") and the image taken with preliminary flash emission (hereinafter referred to as a "pre-flash image G2") contain the corresponding faces, and face regions in these images can be identified based on the results of detection by the face detection unit 24. Supposing here that the area to be photographed contains only one face, and F1 represents a face region in the no-flash image G1 and F2 represents a face region in the pre-flash image G2, the face region F1 and the face region F2 can be deemed to have the same size. Therefore, a size Sf of the face regions F1, F2 can be found from the detection result. It should be noted that the detection result used at this time may be either of the first detection result or the second detection result.

Further, a difference in luminance between the face regions F1 and F2 in the no-flash image G1 and the pre-flash image G2 is equal to an amount of reflected light Lrf from the face contained in the images G1, G2. Supposing that Rf represents a reflectance of the face contained in the images G1, G2, equation (2) is rewritten as equation (4) below:

$$Lrf = Rf \cdot k1 \cdot Sf^2 \qquad (4)$$

It should be noted that the amount of reflected light Lrf can be calculated by subtracting an average luminance of the face region F1 from an average luminance of the face region F2.

Solving equations (3) and (4) for k1, a relationship expressed by equation (5) below is established:

$$k1 = Lr0/(R0 \cdot S0^2) = Lrf/(Rf \cdot Sf^2) \quad (5)$$

Solving equation (5) for Rf, equation (6) below is obtained:

$$Rf = R0 \cdot (Lrf \cdot S0^2)/(Lr0 \cdot Sf^2) \quad (6)$$

Therefore, by measuring the size S0 and the amount of reflected light Lr0 of the face region of the face of a person having the reference reflectance R0 at the reference distance r0 from the light source and storing the values in the EEPROM 34 in advance, and then calculating the size Sf of the face region and the amount of reflected light Lrf, the reflectance Rf of the face to be photographed can be calculated. It should be noted that the higher the reflectance Rf, the lighter the color of the skin.

Therefore, the reflectance calculating unit 25 calculates the amount of reflected light Lrf based on the images G1 and G2 (step ST9), and calculates the size Sf of the face region (step ST10). Then, the reflectance calculating unit 25 calculates the reflectance Rf of the face to be photographed according to equation (6) above (step ST11).

Then, the flash controlling unit 19 obtains the reflectance Rf calculated by the reflectance calculating unit 25, and sets target luminance for the face in the image to be photographed based on the obtained reflectance Rf (step ST12).

For the face of a person with light skin, photographing may be carried out with a darker target luminance to prevent white out. In contrast, for the face of a person with dark skin, photographing may be carried out with a lighter target luminance to provide an image with clear details of the face. By setting relationships between various reflectance values Rf and desirable target luminance values Lf in the form of a LUT (look-up table) 1 and storing the LUT 1 in the EEPROM 34 in advance, the target luminance Lf can be found from the calculated reflectance Rf by referencing the LUT 1.

Subsequently, the flash controlling unit 19 controls light intensity with taking the face and the target luminance Lf into account (step ST13). It should be noted that, if the determination in step ST8 is negative, the flash controlling unit 19 controls the light intensity without taking the face into account (step ST14).

As the control of the light intensity has been finished, the flash controlling unit 19 notifies the overall controlling unit 31 to that effect, and the overall controlling unit 31 gives instructions to synchronously carry out the flash emission (actual flash emission) and image acquisition (step ST15). The flash controlling unit 19 causes the flash to emit at a timing instructed by the overall controlling unit 31 and with a light intensity determined in step ST13 or ST14. At same timing, the exposure adjusting unit 21 informs the aperture value and the shutter speed determined in step ST3 to the aperture diaphragm driving unit 17 and the timing generator 18, the image input controlling unit 23 transfers image data fed from the A/D converting unit 15 to the recording/reading controlling unit 29, and the recording/reading controlling unit 29 records the image data in the memory card 30. In this manner, the flash photography is completed.

It should be noted that the operation of controlling the light intensity with taking the face and the target luminance Lf into account refers to an operation that uses the face detection result and the target luminance Lf in calculation for controlling the light intensity in some way. In contrast, the operation of controlling the light intensity without taking the face into account refers to an operation that does not use the face detection result in the calculation for controlling the light intensity. To control the light intensity with taking the face and the target luminance Lf into account, the flash controlling unit 19 obtains the face information included in the detection result, and calculates the light intensity for actual flash emission using the face information, the target luminance Lf, the no-flash image G1 and the pre-flash image G2. The light intensity may be determined, for example, by dividing the no-flash image G1 and the pre-flash image G2 into multiple regions, calculating a difference in luminance for each combination of corresponding regions of the no-flash image G1 and the pre-flash image G2 to estimate an amount of reflected light for each region, and determining the light intensity based only on the amount of reflected light of a region containing the face so that the region containing the face has the target luminance Lf. Alternatively, an appropriate light intensity may be determined through calculation with weighting the regions so that the amount of reflected light of the region containing the face influences more to determination of the light intensity than the amount of reflected light of non-face regions.

On the other hand, to control the light intensity without taking the face into account, the light intensity for actual flash emission is calculated using the no-flash image G1 and the pre-flash image G2. For example, an amount of reflected light of each part of the subject is estimated by calculating a difference between the no-flash image G1 and the pre-flash image G2, and the light intensity for the actual flash emission is determined based on the average amount of reflected light of the entire subject.

It should be noted that, although the above-described method for calculating the light intensity uses the face information and the target luminance Lf if a face is contained in the image, or does not use the face information if no face is contained in the image, the operation of controlling the light intensity with taking the face and the target luminance into account is not limited to controlling the light intensity using the face information. For example, the operation of step ST14 may be carried out regardless of presence or absence of a face in the image, and if the image contains a face, some modification may be made on the calculated light intensity with taking the target luminance Lf into account. Specifically, for example, if the image contains a face, a certain amount may be subtracted from the calculated light intensity so that the face region has the target luminance Lf. It should be noted that the subtraction amount may be set somewhat large to reliably prevent white out even if the reflection from the face is high. For example, the subtraction amount may be determined with assuming a case where a closeup image of the face is taken with flash.

It should be noted that an under exposure image may result even with the flash emission in this method. However, this can be compensated by adjusting the brightness of the image at the image processing unit 26 after the flash photography. For example, after the flash photography, the image processing unit 26 may apply image processing for adjusting the brightness to the image data stored in the SDRAM 22. At this time, the overall control may be exerted such that the detection result of the face detection unit 24 and the target luminance Lf calculated by the flash controlling unit 19 are fed to the image processing unit 26, so that the image processing unit 26 can adjust the brightness of the image to provide the face region having the target luminance.

Alternatively, in a case where the photography mode is set to the programmed automatic mode and an auto-bracketing function is in effect, over exposure and under exposure images should have been obtained along with the image taken with an appropriate exposure determined by the digital camera 1. Therefore, the image processing unit 26 may select an image having appropriate brightness from images obtained by the auto-bracketing function, and output the selected image as the brightness-adjusted image. The image data adjusted by the image processing unit 26 is recorded in the SDRAM 22 again.

As described above, according to this embodiment, the reflectance Rf of the face region is calculated, and the target luminance Lf for the face is set based on the reflectance Rf. Then, the light intensity of the flash is set with taking the target luminance Lf into account. In this manner, the light intensity of the flash can be controlled depending on the reflectance Rf, i.e., the skin color of the face. For example, when an image of a person with dark skin is to be taken, the light intensity of the flash is set high so that an image with a brightness level that provides clear details of the face can be obtained. In contrast, when an image of a person with light skin is to be taken, the light intensity is set low to provide a desirable image with darker skin color. By taking an image with the flash having the thus set light intensity, an image containing a face with appropriate brightness can be obtained regardless of the skin color.

Although the present invention has been described in conjunction with the exemplary embodiments, the invention is not limited to the above-described embodiments. For example, the control of the light intensity with taking the face into account and the control of the light intensity without taking the face into account can be achieved by any of known controlling methods, besides the methods described herein.

Further, although the area of the face is used as the size of the face region for use in calculation of the reflectance in the above-described embodiment, any value which indicates the size of the face region in the image, such as a longitudinal or transverse length of the face region or a distance between the eyes, may be used.

Furthermore, although the no-flash image G1 and the pre-flash image G2 are used to calculate the reflectance Rf in the above-described embodiment, if the digital camera 1 is provided with a means for emitting AF assist light or a flash emitting means such as tally light other than the flash 11, two images corresponding to the no-flash image G1 and the pre-flash image G2 for use in calculation of the reflectance Rf may be obtained with and without emission of the other flash emitting means.

Moreover, although the validity of the face information is determined based on both the first and second detection results in the above-described embodiment, if the first detection result obtained just before the first-step pressing operation of the shutter release button 2 contains a face, the second detection result may not be referenced. In this case, the determination of the validity of the face information is carried out based only on the first detection result.

Further, although the validity of the face information is determined after acquisition of the no-flash image G1 and the pre-flash image G2 in the above-described embodiment, the validity of the face information may be determined after the second-step pressing operation of the shutter release button 2 has been detected, and thereafter the no-flash image G1 and the pre-flash image G2 may be obtained to calculate the reflectance Rf and set the target luminance Lf to control the light intensity with taking the face and the target luminance into account or without taking the face into account.

Moreover, the timing for feeding the face detection result from the face detection unit 24 to the flash controlling unit 19, the focus adjusting unit 20, the exposure adjusting unit 21 and the reflectance calculating unit 25 is not limited to the points of time just before the first- and second-step pressing operations of the shutter release button 2. The timing for feeding the detection result may be set at predetermined points of time in advance.

In addition, in the digital camera provided with the preliminary flash emission function for measuring an amount of light reflected from the subject or for preventing red eyes, if the face detection can be carried out fast enough, the face detection can be carried out on image data taken synchronously with the preliminary flash emission and image data taken without flash emission before or after the preliminary flash emission. In this case, the same image data is used for the face detection and for controlling the light intensity, and therefore these operations are not influenced by blur due to camera shake. Therefore, if the face detection is carried out successfully, more excellent effect is expected in this case than using detection results obtained at different timings. Even if the face detection cannot been completed in time, the light intensity can be determined using the detection results obtained at other points of time, and therefore at least the same effect as that of the above-described embodiment is ensured.

Thus, the digital camera of the invention is not limited to the digital camera of the above-described embodiment, and all digital cameras in which the light intensity of the flash is controlled based on face detection results and target luminance, which is set based on a reflectance calculated with reference to the face detection results, are encompassed within the technical scope of the present invention.

According to the invention, a face detection result is obtained at a predetermined point of time after acquisition of an image by the photographing unit has begun, images of the same subject are taken with flash emission and without flash emission, and if the obtained detection result indicates that a face is contained, a reflectance of the face region is calculated based on a difference in brightness between the face regions in the images taken with flash emission and taken without flash emission and the size of the face. The reflectance of the face region varies depending on the skin color. That is, the lighter the skin, the higher the reflectance, and the darker the skin, the lower the reflectance. Therefore, according to the invention, the skin color of the face region can be estimated from the reflectance of the face region.

Further, upon controlling the light intensity of the flash with reference to the detection result at the predetermined point of time, if the detection result at the predetermined point of time indicates that a face is contained, target luminance for the face is calculated from the reflectance, and the light intensity of the flash is set with reference to the detection result and the target luminance. In this manner, the light intensity of the flash can be controlled depending on the reflectance, i.e., the skin color. For example, for photographing a person with dark skin, the light intensity is increased so that an image with a brightness level that provides clear details of face is obtained. In contrast, for photographing a person with light skin, the light intensity is decreased so that a desirable image with darker skin color is obtained. By taking an image with the thus set light intensity of the flash, an image with appropriate brightness of the face can be obtained regardless of the skin color.

What is claimed is:

1. A photographing apparatus comprising:
   a photographing unit for obtaining an image representing a subject through photographing;

a face detecting unit for detecting a face from the image obtained by the photographing unit; and a reflectance calculating unit for calculating a reflectance of the face, the reflectance calculating unit obtaining a result of the face detection by the face detecting unit at a predetermined point of time after acquisition of the image by the photographing unit has begun, obtaining images of the same subject taken with flash emission and taken without flash emission, and if the obtained detection result indicates that a face is contained, calculating the reflectance of the face based on a difference in brightness of the face between the images taken with flash emission and taken without flash emission and the size of the face; wherein the reflectance calculating unit calculating a reflectance of the face contained in the area to be photographed according to the equation:

$$Rf = R0 \cdot (Lrf \cdot S0^2) / (Lr0 \cdot Sf^2)$$

wherein Rf is the reflectance of the face, R0 is a reference reflectance at a reference distance, Lrf is an amount of reflected light from a face, S0 represents a size of a face region of a face having a reference reflectance R0, Lr0 represents an amount of reflected light at a reference reflectance R0, and Sf is a size of a face region.

2. The photographing apparatus as claimed in claim 1, further comprising:

a flash emitting unit for emitting flash light; and a light intensity controlling unit for controlling light intensity of the flash with reference to the detection result outputted by the face detecting unit at the predetermined point of time, the light intensity controlling unit calculating target luminance for the face based on the reflectance if the detection result obtained at the predetermined point of time indicates that the face is contained, and controlling the light intensity of the flash with reference to the detection result and the target luminance.

3. The photographing apparatus as claimed in claim 2, wherein the photographing unit carries out photographing with emission of the flash and photographing without emission of the flash to obtain the images taken with flash emission and taken without flash emission.

4. A method for controlling a photographing apparatus including a photographing unit for obtaining an image representing a subject through photographing and a face detecting unit for detecting a face from the image obtained by the photographing unit, the method comprising:

obtaining a result of the face detection by the face detecting unit at a predetermined point of time after acquisition of the image by the photographing unit has begun;

obtaining images of the same subject taken with flash emission and taken without flash emission; and if the obtained detection result indicates that a face is contained, calculating a reflectance of the face based on a difference in brightness of the face between the images taken with flash emission and taken without flash emission and the size of the face wherein calculating a reflectance of the face comprises: calculating a reflectance of the face contained in the area to be photographed according to the equation:

$$Rf = R0 \cdot (Lrf \cdot S0^2) / (Lr0 \cdot Sf^2)$$

wherein Rf is the reflectance of the face, R0 is a reference reflectance at a reference distance, Lrf is an amount of reflected light from a face, S0 represents a size of a face region of a face having a reference reflectance R0, Lr0 represents an amount of reflected light at a reference reflectance R0, and Sf is a size of a face region.

5. A computer-readable recording medium containing a program for causing a computer to carry out a method for controlling a photographing apparatus including a photographing unit for obtaining an image representing a subject through photographing and a face detecting unit for detecting a face from the image obtained by the photographing unit, the program comprising the instructions of:

obtaining a result of the face detection by the face detecting unit at a predetermined point of time after acquisition of the image by the photographing unit has begun;

obtaining images of the same subject taken with flash emission and taken without flash emission; and if the obtained detection result indicates that a face is contained, calculating a reflectance of the face based on a difference in brightness of the face between the images taken with flash emission and taken without flash emission and the size of the face wherein calculating a reflectance of the face comprises: calculating a reflectance of the face contained in the area to be photographed according to the equation:

$$Rf = R0 \cdot (Lrf \cdot S0^2) / (Lr0 \cdot Sf^2)$$

wherein Rf is the reflectance of the face, R0 is a reference reflectance at a reference distance, Lrf is an amount of reflected light from a face, S0 represents a size of a face region of a face having a reference reflectance R0, Lr0 represents an amount of reflected light at a reference reflectance R0, and Sf is a size of a face region.

* * * * *